United States Patent [19]

Lee

[11] Patent Number: 4,862,387
[45] Date of Patent: Aug. 29, 1989

[54] UNIVERSAL-GAIN DATA PLOTTER

[76] Inventor: Arnold St. J. Lee, 1033 Hilts Ave., Los Angeles, Calif. 90024

[21] Appl. No.: 178,893

[22] Filed: Mar. 31, 1988

Related U.S. Application Data

[63] Continuation of Ser. No. 690,594, Jan. 11, 1985, abandoned.

[51] Int. Cl.$^4$ .......................... G01D 1/16; B43L 33/00; H03L 5/00; G01R 1/38
[52] U.S. Cl. ........................................ 364/520; 33/33; 33/35; 307/264; 324/115; 324/121 R; 340/723; 340/754
[58] Field of Search ................ 364/520; 340/715, 722, 340/723, 753, 754; 346/33 R, 35; 307/264; 328/53, 163, 172; 324/71.4, 115, 121 R; 367/65, 67

[56] References Cited

U.S. PATENT DOCUMENTS

| | | | |
|---|---|---|---|
| 2,375,570 | 5/1945 | McDermott | 367/65 |
| 3,204,144 | 8/1965 | Deavenport | 324/121 R |
| 3,636,463 | 1/1972 | Ongkiehong | 367/67 X |
| 3,873,918 | 3/1975 | Talbert | 324/115 X |
| 3,886,526 | 5/1975 | Smith | 340/722 X |
| 4,034,291 | 7/1977 | Allen et al. | 324/115 |
| 4,064,480 | 12/1977 | Howlett | 367/67 |
| 4,145,697 | 3/1979 | Ballinger | 46/35 |
| 4,236,151 | 11/1980 | Russ et al. | 340/722 |
| 4,322,816 | 3/1982 | Spangler | 364/520 X |
| 4,334,124 | 6/1982 | Imsand et al. | 364/520 X |
| 4,409,597 | 10/1983 | Nakamura et al. | 346/35 |
| 4,449,120 | 5/1984 | Rialan et al. | 367/67 X |
| 4,581,725 | 4/1986 | Pilarcik, Jr. | 367/65 X |
| 4,679,162 | 7/1987 | Ferber et al. | 367/67 X |
| 4,690,509 | 9/1987 | Bohmer | 340/754 |
| 4,727,521 | 2/1988 | Meyer et al. | 367/65 X |

Primary Examiner—Parshotam S. Lall
Assistant Examiner—Joseph L. Dixon
Attorney, Agent, or Firm—Spensley Horn Jubas & Lubitz

[57] ABSTRACT

This apparatus and method permit plotting a series of data values at an optimum scale expansion, even when the largest value is not known in advance, for permanent recording or transitory display. In response to each data value several display signals are derived, corresponding to representation of that data value at several different scale expansions. These several signals are used to position respective indicia on a visually readable medium. If desired the several display signals may all be recorded, as for example on magnetic tape, and the acutal plotting (i.e., production of indicia) performed later. The data-value magnitude is represented by respective displacements of the indicia in one direction from a baseline, at the several scale expansions. Thus indicia are produced for all of the scale expansions that correspond to on-scale positions. The medium moves relative to the indicia-producing apparatus, along a second, orthogonal direction. Preferred hardware includes a shift register with enough bits for the full range of data; but only the least-significant-bits end, the number of places equalling the display-medium resolution, is used to position indicia.

18 Claims, 5 Drawing Sheets

UNIVERSAL-GAIN DATA PLOTTER

This is a continuation of application Ser. No. 690,594 filed on 1-11-85 now abandoned.

BACKGROUND

1. Field of the Invention

This invention relates generally to methods and apparatus for plotting data, whether permanently or transitorily, and more particularly to methods and apparatus for plotting a sequence of data values at a suitable scale expansion even when the largest of the values is not known in advance.

2. Prior Art

Known devices and methods for displaying and recording plots of data-value sequences are encumbered by the need to select suitable scale expansions or ranges for such plots. By "suitable scale expansion" I mean a scale expansion that presents the maximum data value, or perhaps several different data values of interest, at a point relatively near full-scale.

This constraint is important because the geometric uncertainty introduced by a plotting apparatus in positioning of the indicia on the plot, and also the user's uncertainty in visually reading the plot, are generally a constant fraction of full-scale, independent of scale position By selecting a scale expansion that places data values of interest near full-scale, the equipment operator ensures that such uncertainties will represent the smallest possible fractional error in the data value as read from the plot.

This requirement for scale selection, however, poses at least three major disadvantages.

First, complexity and correspondingly added cost are introduced into the apparatus, since a scale-expansion control and readout (sometimes combined) must generally be provided for the operator's use.

Concededly, in some bare-bones systems (especially digitally controlled ones) the scale-expansion control may be a control keyboard that is shared with other functions of the apparatus; similarly the scale-expansion readout may be a display that is shared with other functions of the apparatus. It might be argued that in such systems the complexity and cost added on account of the scale-expansion control and readout are negligible. As is well known to anyone who operates measuring instrumentation, however, such apparent simplification and economy in the apparatus are false, since they are obtained at the severe expense of introducing complexity and delay into the operator's life.

At the other end of the spectrum of equipment complexity, perhaps not often encountered in the most modern equipment, is the analog recording system in which different scale expansions are implemented by voltage-divider strings of precision resistors or by other elaborations of the apparatus itself. In this type of equipment the provision of selectable scale expansions is clearly a very significant expense.

A second major disadvantage of the requirement for scale selection arises from the limited capacity for prescience on the part of most operators. Often the maximum value to be received in a sequence of data values is not known until the sequence is complete. Therefore the operator can only make the best educated guess of the anticipated maximum value, and set the scale expansion in accordance with this guess.

If the guess is high, then the maximum data value may be displayed at a needlessly low position on the scale—resulting in excessive error due to plotting and reading uncertainties, as explained above. If the guess is low, then the maximum value will be off-scale—resulting in either complete loss of detailed information at the maximum data value, or in the necessity for resetting the scale expansion during the plotting process.

This latter possibility, the resetting of the scale expansion during plotting, has in turn certain drawbacks of its own. The operator must be vigilant to detect the need for resetting before the plot goes off-scale. The operator must take attention and the use of his or her hands away from other activities to do the actual resetting. In the case of permanent recordings the resetting introduces into the graph a discontinuity which may be esthetically objectionable if the record is to be published.

The third major disadvantage of the requirement for scale selection is that some data values of very great interest may be much smaller than the maximum value. No single scale expansion can both (1) display the maximum value as an on-scale point and (2) display much smaller values near full-scale for minimal error of positioning and reading This basic fact of life can be a very serious aggravation with some types of data, as it can create a need for multiple resettings of the scale expansion during the progress of the data sequence, and multiple discontinuities in permanent recordings of the plot.

Some equipment designers have attempted to alleviate the second and third major problems discussed above, by providing automatic range changing as the data stream goes off-scale. As is painfully well known, however, automatic range changing introduces its own annoyances. In some types of equipment there is often an associated additional equipment expense. Furthermore, the automatic range change somehow always seems to cut in just before a peak or trough in the plot, aggravating the esthetic problem (and even the readability) mentioned above. Finally, the provision of overlapping range-change regions—sometimes used in an effort to reduce the number of unesthetic discontinuities in the graph—all too often instead only results in badly confusing the readout, and even the operator.

Prior-art techniques thus fail to satisfy the clear demand for a simple, economical way of transitorily displaying and permanently recording data of interest near full-scale, when (1) maximum values are not known at the time of equipment manufacture—or even at the time of starting the plot—or when (2) data values of great interest are substantially smaller than the maximum values in the data stream. What the prior-art fails to provide is a data plotter that has universal scale expansion, or, more simply put, universal gain.

SUMMARY OF THE DISCLOSURE

My invention provides apparatus and method for plotting a curve consisting of a sequence of data values from a data source at a suitable scale expansion, even when the largest of the data values is not known in advance. The general idea of "plotting a curve consisting of a sequence of data values" is expressed hereinafter as "plotting a sequence of data values." Plotting is done on a visually readable medium, either transitory as in the case of an electronic display or permanent as in the case of a strip-chart recorder.

Equivalently, the plotting can be done on a visually nonreadable medium to produce a latent image or a transferable pattern of electrical charges or the like, and the image later developed or transferred to form a visually readable plot. In the interest of simplicity of the description, this equivalent technique will not be mentioned further, either as to apparatus or method.

In its broadest forms the apparatus of my invention includes some means for receiving the sequence of data values from the data source, and for deriving in response to each such data value a multiplicity of display signals. These signals substantially correspond to representation of each data value at a respective multiplicity of scale expansions.

The apparatus also includes some means for producing a corresponding multiplicity of visible indicia on the medium. For purposes of generality I refer to this part of the apparatus as "indicia-producing means." The magnitude of each data value at the respective multiplicity of scale expansions is represented by respective displacements of the indicia from a baseline—along a first dimension of the medium.

The apparatus of my invention in its broadest forms also includes some means for providing relative motion between the medium and the indicia-producing means. This motion is along a second dimension of the medium, usually orthogonal to the first dimension. The part of the apparatus that produces this motion I will call the "relative-motion-producing means."

(If preferred, the apparatus may also include some means for recording the multiple display signals as electronic signals, for later playback and indicia production. The recording means may include, for instance, a magnetic tape, a magnetic disc, or a "R. A. M."-type computer memory.)

In other words, my invention provides a plot of the data sequence at several scale expansions or ranges "simultaneously." (To speak more rigorously, the different data points for each value of time, or for each value of whatever independent variable is in use, need not be plotted at precisely the same instant. Generally, however, it is most straightforward to plot all the points for each value of the independent variable, before moving on to points for the next value of the independent variable.)

Six scale expansions is a convenient number for many applications. Very typically these scale expansions may be separated by factors of two, so that one indicium for each data value will always be found in the upper half of the scale. Using six scale expansions, with neighboring scale expansions separated by factors of two, the overall variation in implication of a "full scale" reading is a factor equal to the sixth power of two—that is, a factor of sixty-four.

This rather large range of full-scale values is sufficient to encompass the full range of data variation in the great bulk of biological data monitoring circumstances. Blood pressure, for example, is seldom less than twenty pounds per square inch or more than three hundred—and this variation is a factor of only fifteen, less than the fourth power of two.

At first blush the plotting of the same data at several scale expansions simultaneously might be expected to appear cluttered or confusing. It is a surprising fact, however, that neither of these possible drawbacks materializes. If none of the indicia is off-scale, then the highest indicium on the scale is clearly at the lowest scale expansion (highest "range"), and the others are disregarded. If all but one of the indicia is off-scale, then the only indicium remaining on-scale is clearly at the highest scale expansion.

If some smaller number of the indicia is off-scale, then the operator can very readily determine which scale expansion gave rise to the indicium that is furthest upscale. To do so the operator simply notes either (1) how many indicia appear at lower positions on the scale, or (2) in the case of recorded plots, how many plotted sequences of data values moved off-scale earlier in the record. When there are six scale expansions in use, the maximum number of indicia below any given indicium is five, and these are easily counted. Typically, however, the operating ranges will be chosen for a given application so that there will usually be only one to three indicia below the furthest-up-scale indicium of interest—as is illustrated in FIG. 1.

In any event, the operator very quickly comes to associate a known scale expansion with each "curve" that is visible on the display or record. With brief practice this process becomes nearly intuitive. For applications in which a record is to be published—that is to say, reproduced in print or in a projected slide—the highest on-scale curve can be hand-labelled with the appropriate scale expansion. If several different scale expansions produce the best display of data points of interest in different time intervals, then all the useful scale expansions (or all the scale expansions in use) can be labelled.

Remarkably enough, even for individuals examining such multiple-trace recordings for the first time, there is very little confusion and very little impression of clutter.

In extraordinary applications involving greater ranges of data variation, data may be plotted at an additional two or three scale expansions, or if preferred the factors separating some or all of the scale expansions may be increased. To give examples, a factor of four between adjacent expansions is very readily obtained, or with slightly more-elaborate electronics or programming a factor of three or a factor of two-and-a-half may be provided—ensuring that one data-value indicium will always be found in the upper three-quarters, two-thirds, or six-tenths, respectively, of the scale.

Display signals that correspond to off-scale displacements along the first dimension, should not, of course, produce on-scale indicia. In some embodiments of my invention, however, it is nevertheless desirable to include also some means for suppressing operation of the indicia-producing means under certain circumstances. More specifically, these "suppressing means" may be used simply to prevent production of a series of indicia along the full-scale line of the display medium, where the actual values are off-scale. On the other hand some users may prefer to see a series of indicia along the full-scale line as reminders of the curves that have gone off-scale, in which case the "suppressing means" may be unnecessary. With some types of data-handling and plotting systems, such "suppressing means" may be needed to prevent plotting of a spurious on-scale indicium in response to an off-scale data value.

If present, the so-called "suppressing means" suppress operation of only the indicia-producing means, not operation of the relative-motion-producing means. In other words, when there is an off-scale signal the chart paper or the CRT electron beam advances to the next independent-variable position without producing any indicium corresponding to that off-scale signal.

Turning now to the method of my invention, in its broadest forms that method includes automatically receiving the sequence of data values from the data source, and automatically plotting each data value on a visually readable medium at a preselected multiplicity of scale expansions.

In preferred embodiments of this method, data values are not plotted at scale expansions that would produce off-scale points. As mentioned in regard to the apparatus, depending on the mechanisms used the automatic plotting of off-scale points sometimes produces a line of indicia along the full-scale edge of the display medium, or even spurious on-scale points.

The method of my invention may also be regarded as a series of at least these three steps:

(1) receiving the sequence of data values from the data source, and deriving in response to each data value a multiplicity of display signals that substantially correspond to representation of that data value at a respective multiplicity of scale expansions;

(2) in response to the display signals for that data value, producing a corresponding multiplicity of visible indicia on the medium, the magnitude of that data value at the respective multiplicity of scale expansions being represented by respective displacements of the indicia from a baseline, along an indicia-production line that substantially parallels a first dimension of such medium; and (3) providing relative motion between such medium and the indicia-production line, along a second dimension of the medium—generally a dimension orthogonal to the first.

When so regarded, to avoid generating on-scale or full-scale indicia in response to off-scale signals the method of my invention may preferably also include the step of omitting the indicia-producing step but not the relative-motion-producing step, with respect to display signals that correspond to off-scale displacements.

If desired, two additional steps may be inserted just after step (1)—namely, (1a) recording the multiplicity of signals, and later (1b) playing the recording back for purposes of steps (2) and (3).

All of the foregoing operational principles and advantages of the present invention will be more fully appreciated upon consideration of the following detailed description, with reference to the appended drawings, of which:

DETAILED DESCRIPTION OF PREFERRED EMBODIMENTS

Figure 1:
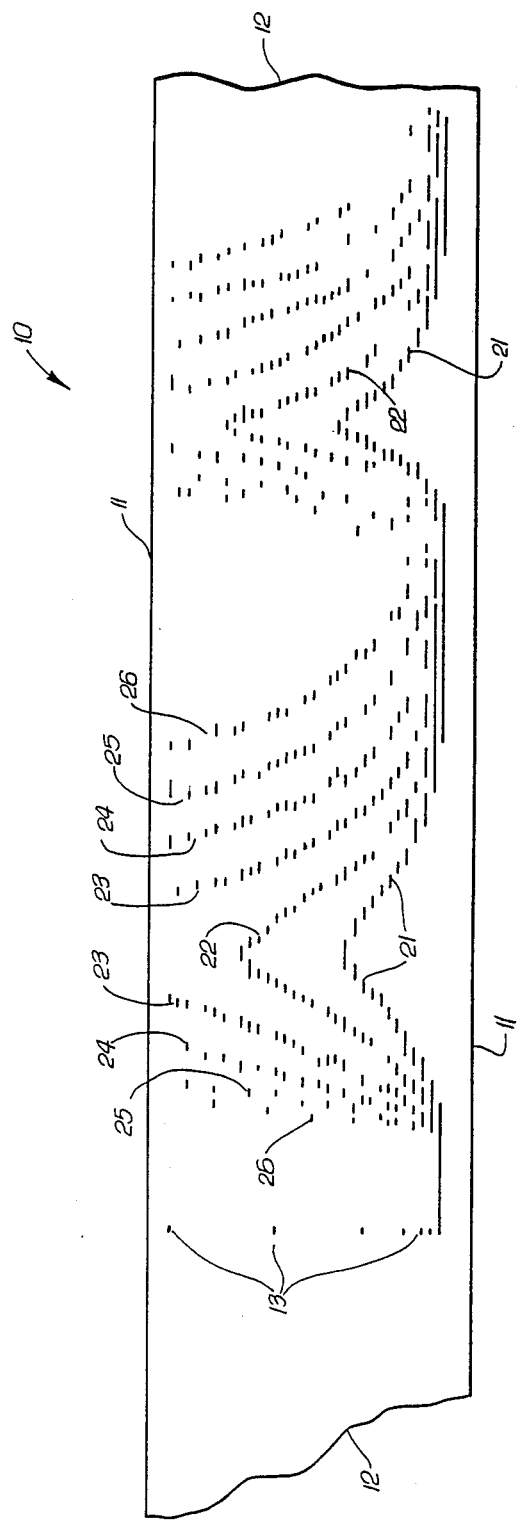
FIG. 1 is a recording of a sequence of data values produced in accordance with a preferred embodiment of my invention.

As shown in FIG. 1, in accordance with my invention a permanent plot of a sequence of data points can be produced on a strip chart 10. Such a chart s typically a piece of paper with longitudinal edges 11, which may be truncated as suggested by torn-off transverse edges 12.

If desired the invention may provide a test pattern 13 at the beginning of the recording, suggesting the relationships between the various scale expansions used.

Then the data-point sequence begins, and as shown in the illustration there are produced not one but six separate series of indicia.

Of course FIG. 1 is merely an example of the behavior of an actual data-point sequence, but it illustrates how the invention deals with changing data levels—and how the results may be interpreted. As is apparent in FIG. 1, for the particular phenomenon recorded in that figure the upper four data-point sequences 23, 24, 25 and 26 started near the zero point of the scale and then rapidly moved off-scale. The lower two data-point sequences 21 and 22 also started near zero and moved up-scale, but not off-scale, and rapidly separated from each other.

Subsequently the lower two sequences 21 and 22 reached a visible peak, and declined toward zero. In the part of the plot near the peak, however, the upper four data-point sequences 23 through 26 were apparently far off-scale, and in fact there is no indicium corresponding to those "curves"—not even a series of indicia along the top edge of the paper. To simplify and unclutter the plot, some users may consider it desirable to "suppress" such indicia: that is, to produce no indicium corresponding to off-scale values.

Later in the data stream, as the two lower data-point sequences 21 and 22 declined sufficiently, the third data-point sequence 23 came back on-scale, and then successively the upper three sequences 24, 25 and 26.

The same general pattern then repeated at another peak, somewhat narrower than the first, which appears toward the right end of the illustration. This second peak has been left with only minor labelling in the illustration, so that the actual appearance of the "raw" record can be more readily seen.

If the data sequence plotted in FIG. 1 happened to be a time-changing concentration of some constituent in the blood, then—purely as examples—the lowest data-point sequence 21 might represent a full-scale concentration of 0.64 percent. The second sequence 22 might then represent a full-scale concentration of 0.32 percent; the third sequence 23, 0.16 percent; the fourth sequence 24, 0.08 percent; the fifth sequence 25, 0.04 percent; and the sixth sequence 26, 0.02 percent.

The first peak is better read using data-point sequence 22, since reading error would be larger for sequence 21. It is also necessary to know the exact distance between the lowest and highest printed points on the scale. This distance, for reasons which will later become clear, is thirty-one times the smallest increment (the distance between adjacent points). Looking, therefore, at data-point sequence 22, and reading the peak height against the corresponding assumed scale of 0.32 percent, it appears that the peak reached twenty-two thirty-firsts (22/31) of full-scale, or a value of $0.32\% \times 22/31 = 0.227\%$. By a similar process the second peak may be seen to have reached $0.32\%\ 26/31 = 0.268\%$.

(If preferred for a more orderly-seeming presentation, the apparatus may be calibrated so that the "full scale" chart position is one increment beyond the furthest-upscale indicium, in which case the highest indicium represents 31/32 of full-scale on each range. With this arrangement the recorded values could be taken as 22/32 and 26/32 of full-scale, or 0.32%×22/32=0.22% and 0.32%×26/32=0.26%, respectively.)

It should be noted that the lower curve 21 is very readily disregarded, except for the clue that it gives as to the scale expansion to be used for the further-upscale curve 22. The off-scale curves 23 through 26 are likewise readily disregarded with very little conscious mental screening process.

Figure 2:
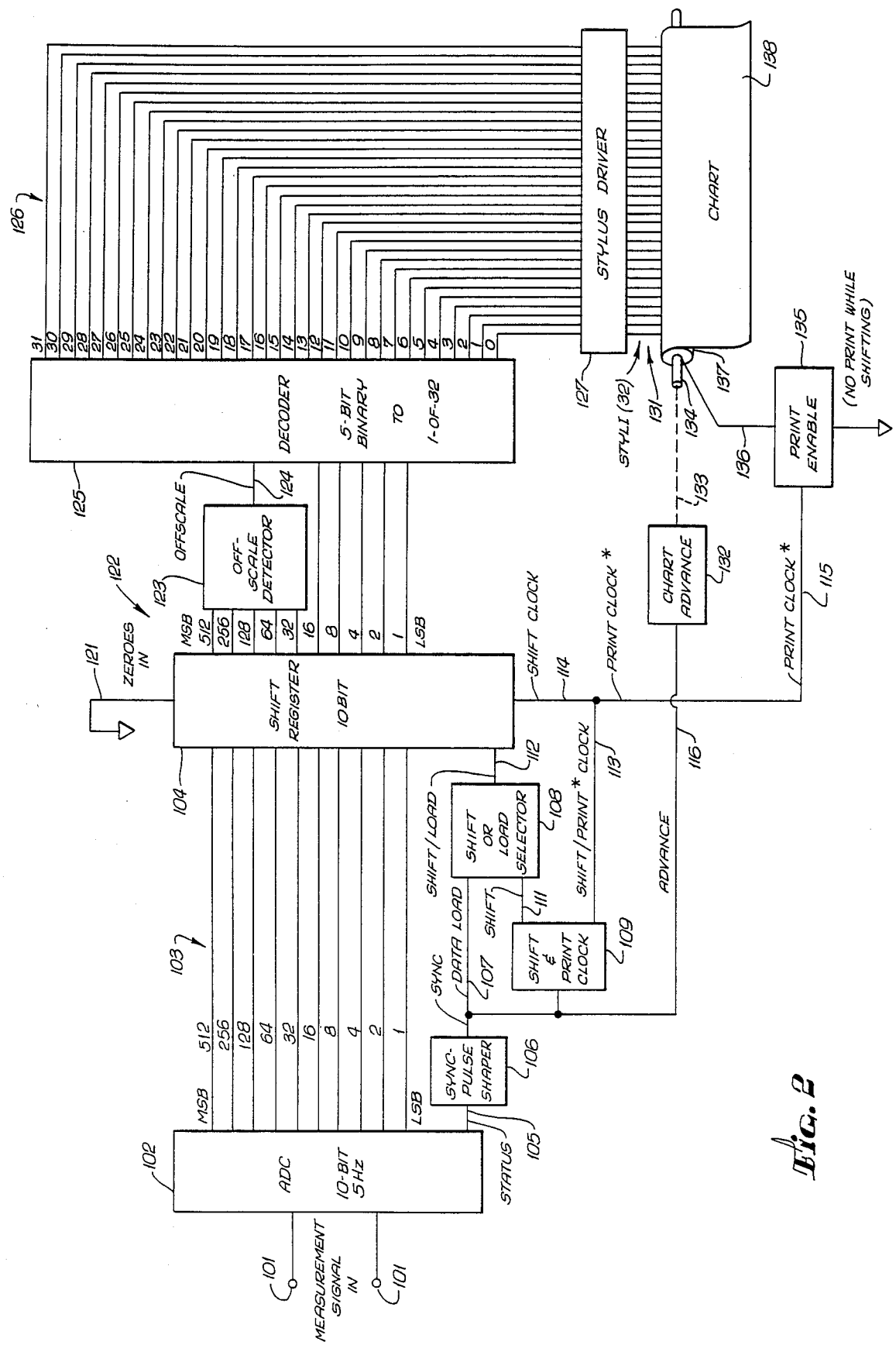
FIG. 2 is primarily an electrical and partially a mechanical block diagram of a preferred embodiment of my invention, for producing a recording such as FIG. 1.
Figure 3:
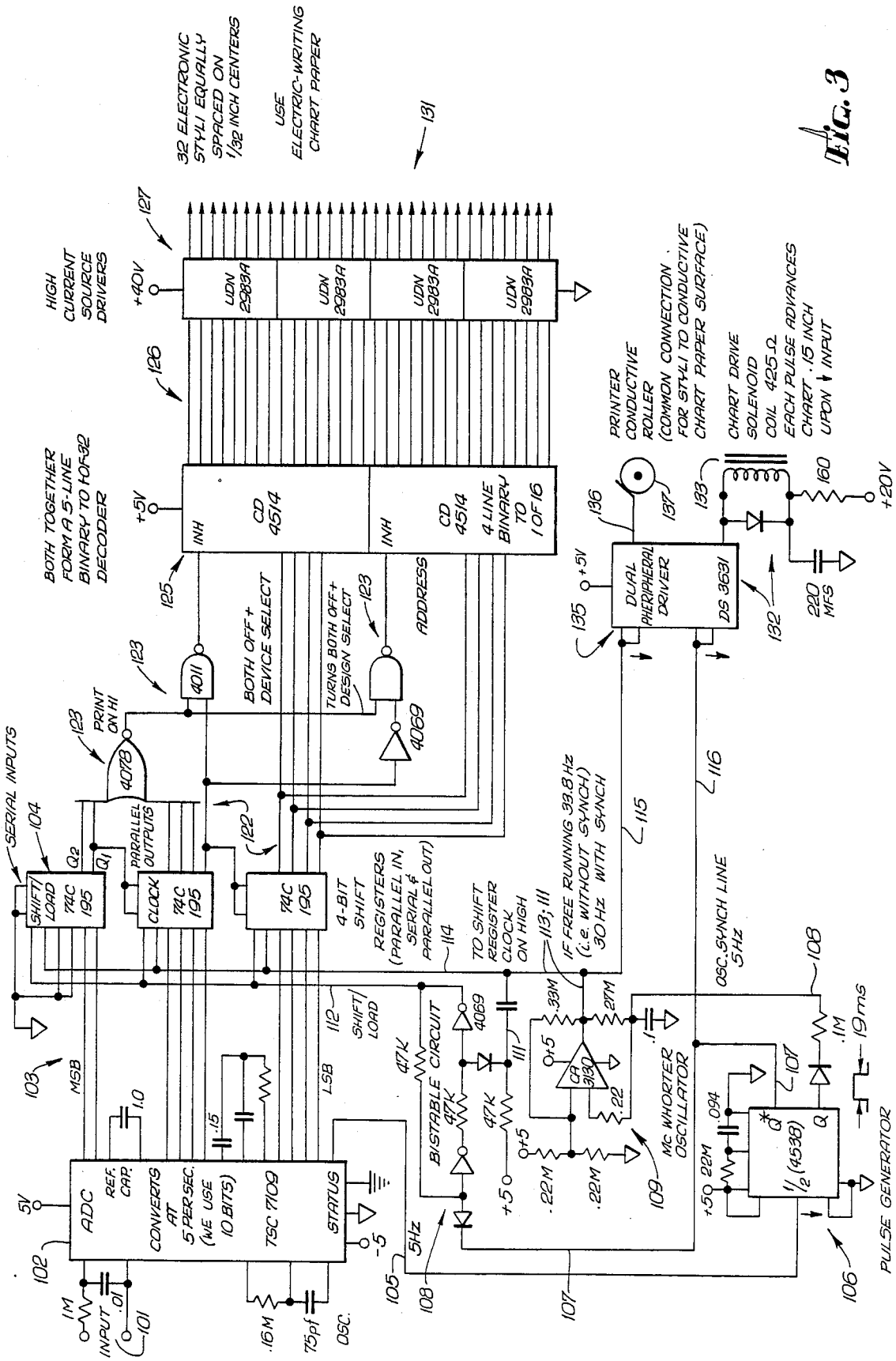
FIG. 3 is a more-detailed electrical schematic diagram of the FIG. 2 embodiment.

As shown in FIGS. 2 and 3, such a multiple plot can be produced by a relatively simple apparatus. The blocks in the block diagram of FIG. 2 may be related to the corresponding component groups in the schematic of FIG. 3 through the correspondence of reference numerals which has been observed in preparing these two drawings. The operational description given here will be presented first with reference to the block diagram, FIG. 2, and with reference to the timing diagram in FIG. 4.

Data from a source such as medical instrumentation are introduced directly as an analog input measurement signal to the input terminals 101 of the apparatus. These terminals conduct the signal to an analog-to-digital converter (ADC) 102, which has an internal oscillator and two principal outputs.

One of these outputs is a digital version of the analog input signal. This digital output appears in binary form on a ten-line data bus 103, in the form of ones and zeroes having various implications from—a "1" (since $2^0=1$) at the least-significant-bit (LSB) end of the bus 103, to a "512" ($2^9=512$) at the most-significant-bit (MSB) end.

Thus the output signal of the ADC 102 can range from zero, which corresponds to zeroes on all ten data lines in the bus 103, through a decimal value of 1,023, which is the sum of the implications of ones on all ten data lines—namely, $1+2+4+\ldots 256+512=1,023$. The overall range of nonzero values which can be accommodated by the ADC is very large—from 1 to 1,023—an overall factor of 1,023 in data-value magnitude.

The internal oscillator within the ADC 102 determines the times at which the digital output is updated, in response to the potentially varying input measurement signal at 101.

The digital value standing on the data bus 103 is directed to the input terminals of a shift register 104, into which all ten bits can be parallel-loaded under appropriate circumstances.

Those circumstances are defined by the other output of the ADC 102, in conjunction with the other components 105 through 113 in the lower left portion of the diagram. Conceptually, these components have two major functions. First, they ensure that the shift register 104 will not accept signals from bus 103 while the ADC is in the process of changing those signals. Second and perhaps more importantly, these same components also control the operation of the shift register 104 and of the strip-chart recorder 131, 132, 134, 135—making use of the internal oscillator in the ADC 102 to provide a time base—so that all the necessary data-processing steps occur in appropriate order and at the appropriate times.

The second output of the ADC 102 is a "status" signal 105, which may conveniently have a frequency of five hertz (5 Hz)—or, in other words, a period of two hundred #milliseconds (200 msec). The status signal 105 indicates directly the condition of the internal oscillator in the ADC, which is to say, the progress of the ADC's update cycle. The waveform of this status signal 105 will typically be a square wave (that is, a waveform that is "high" as long as it is "low" in each cycle), but as will become clear this waveform need not conform to any particular stringent requirements. My invention requires only that it include a negative-going "status out" signal each 200 msec, as shown by the downward arrows in the waveform 105, 107 at the top of FIG. 4.

Figure 4:
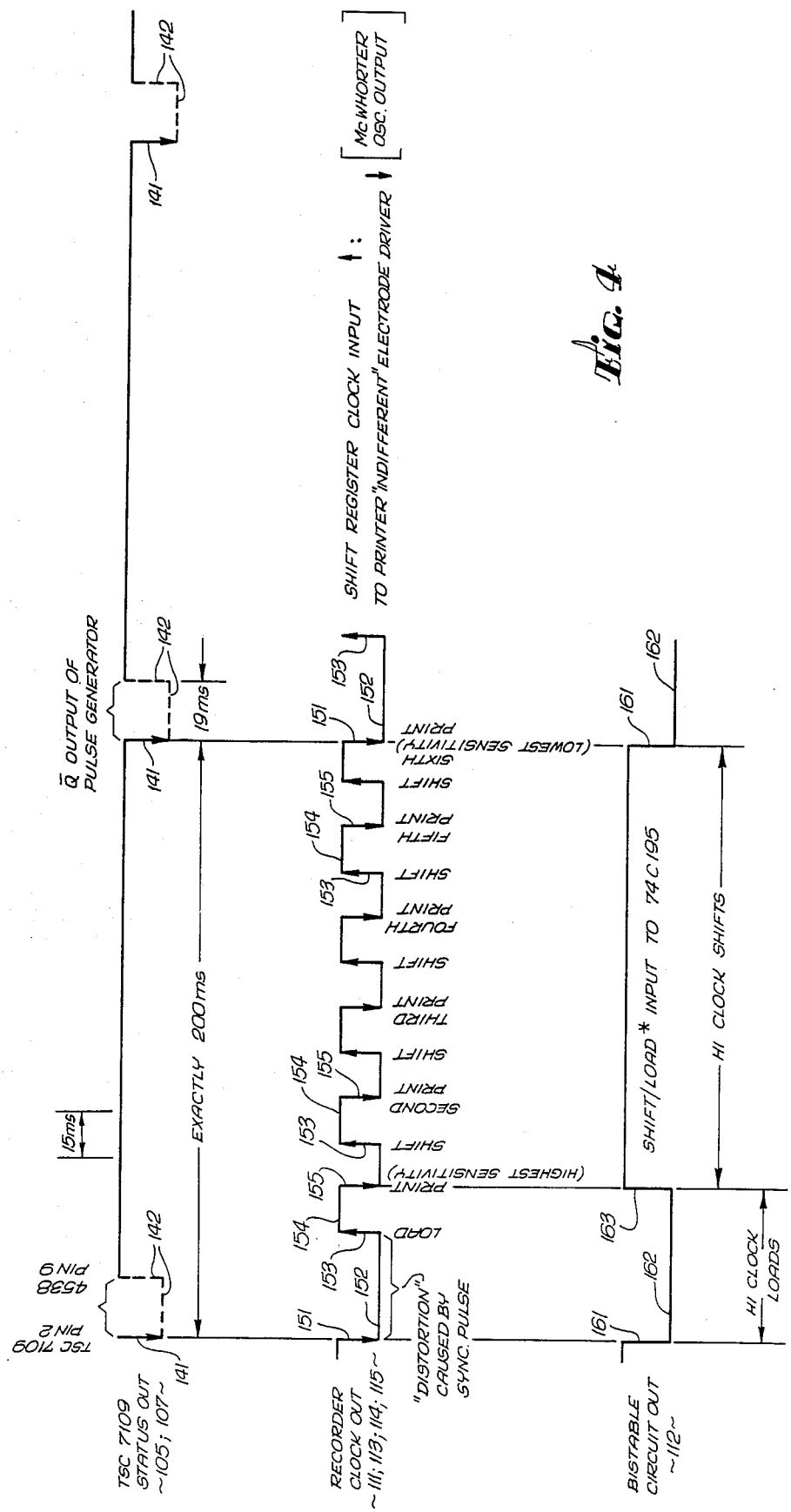
FIG. 4 is a timing diagram illustrating the operation of the embodiment of FIGS. 2 and 3.

The next block shown on the diagram—the sync-pulse shaper 106—uses this periodic "status out" signal to generate a very asymmetric waveform shown by the entire waveform 105, 107 in FIG. 4. As indicated in that drawing, this waveform has only a relatively brief "low" period 141–142, preferably 19 msec, in each cycle, and the signal is "high" during the other 181 msec. This waveform is the "sync" pulse that appears on the output line 107 (FIG. 2) of the sync-pulse shaper 106.

The sync pulse 107 is used in three parts of the apparatus.

First, it participates in defining the times when data may be safely loaded from the ADC 102 into the shift register 104. This function is symbolized, in a somewhat figurative way, by the direct input of the sync signal as a "data load" signal into the "shift or load selector" block 108. Soon after the arrival of the "data load" signal 107 at the shift or load selector 108, the latter block produces a signal 112 called "shift/load*". This signal is applied to the shift register 104 to determine whether the shift register 104 when strobed will (1) load data from the bus 103 or (2) shift that data within the register 104. The purpose of the shifting will be explained shortly.

(The name "shift/load*" of the signal at 112 ends in an asterisk "*" to designate a complement signal. The signal into the register 104 causes the register to "shift" when the signal is "high" and to "load" when the signal is "low." Since the register 104 loads when the shift-/load* signal is low, not when it is high, the signal at 112 is a logical complement signal with regard to the "load" part of the signal name. The asterisk is used for this signal and certain other complement signals in the diagram, in preference to the use of a "bar" over the signal name, since the bar is typographically cumbersome.)

Secondly, the sync pulse 107 is directed to a "chart advance" block 132, which controls the relative motion of the chart and the indicia-producing apparatus. This part of the invention will be discussed further below.

Thirdly, the sync pulse 107 is applied to a "shift & print clock" 109. That clock is preferably an oscillator running at 33.8 Hz, but forced by the sync pulse 107 to run in step with the oscillator in the ADC 102. As suggested in FIG. 4, the clock 109 is prevented from starting its cycle when the sync pulse 107 is low. Moreover, the cycle of the clock 109 begins with a low; therefore the clock 109 does not generate a positive-going pulse until a half-cycle (at 33.8 Hz) after the sync pulse 107 goes high. Hence the first positive-going pulse 153 in the overall cycle of the clock output signal 111 occurs after a 22 msec delay during which the clock output signal 111 is "low"—as at 152 in FIG. 4.

If not synchronized by the sync pulse 107 the clock 109 would produce 33.8/5=6.8 complete cycles per cycle of the ADC, but due to the synchronization it produces exactly six cycles, the first cycle having a protracted low portion 152. This "distortion" of the clock outputs allows the ADC 102 time to complete its data updating.

The clock output 113 is applied directly to the shift register at 114 to control operation of that register, and also to a "print enable" block 135 in the printing mechanism, for purposes to be explained. Another version "shift" 111 of the clock output signal, however, is directed to the previously mentioned "shift or load selector" 108. This selector 108 combines the information in the sync pulse 107 and the shift signal 111 to construct the "shift/load*" signal 112 discussed above.

It can be seen from FIG. 4 that the selector 108 performs this function by constructing a waveform that is synchronized with the sync pulse 107: it goes low (at 161) when the sync pulse goes low (at 141), but then goes high (at 163) in response to the first negative-going pulse 155 of the clock shift signal 111. The selector 108 holds its shift/load* output signal high until the next negative-going sync pulse 107.

As a consequence the first positive-going pulse 153 of the shift/print* clock signal 113 from the clock 109 arrives at the shift register 104—at its "shift clock" strobe input terminal 114—while the shift/load* signal is low. The shift register 104 is thus strobed during the load* portion 162 of the shift/load* signal cycle, and the register 104 therefore loads data from the bus 103 at that time.

At the first negative-going pulse 155 in the shift/print* clock signal 113, there is no response in the shift register 104, but the shift/print* clock signal 113 is also applied as a "print* clock" signal 115 to the print enable block 135. This block 135 permits the recording apparatus 131, 137 to print an indicium on the chart 138 (provided that other requirements are met). Thus the apparatus prints an indicium for the particular data value standing on the data bus 103, at one scale expansion, at a time when (1) the ADC is not updating, (2) the chart is stationary, and (3) the shift register is not loading.

We will return to explanation of the remainder of the shift/print* clock signal cycle, but first it is necessary to introduce the circuitry that follows the shift register.

All ten input bits from the data bus 103 to the register 104 are output from the same register 104 on another ten-line data bus 122. This latter bus, however, is split into two five-line buses: the five least-significant-bit (LSB) lines, with implications from "1" to "16", are directed to a decoder 125 in preparation for printing. The five most-significant-bit (MSB) lines, with implications from "32" to "512", are directed to an "off-scale detector" block 123.

First I will explain what happens to the signals in the "bottom half" of the shift register output bus 122.

The decoder interprets the five LSB lines to produce an "on" or "off" signal on just one of the thirty-two output lines 126. These thirty-two lines correspond respectively to numerical values from zero through thirty-one, as indicated by the numerals from "0" through "31" in the drawing. This numerical translation process uses exactly all of the information in the five LSB lines, since those lines are capable of carrying a total implication of zero (corresponding to all zeroes on the five lines) or a total implication of thirty-one (corresponding to all ones, calculated as 1+2+4+8+16=31), or any value between.

The thirty-two signal lines 126 from the decoder are directed to a set of low-impedance buffers identified as the "stylus driver" block 127, which supply relatively high current to thirty-two recorder styli 131. In operation of the apparatus the latter are of course juxtaposed to the chart paper 138, and produce indicia on the chart paper 138 when the print enable block 135 is actuated by the previously mentioned print clock* signal 115.

The styli 131 are spaced closely and uniformly across the width of the chart paper so that they represent a recording scale with thirty-one increments—from a point at "zero" through a point at "thirty-one". The resolution of this scale is one-thirty-first (1/31) of "full-scale" if the full-scale point is taken as the location of the furthest-upscale stylus; or is one-thirty-second (1/32) of "full-scale" if the full-scale point is taken as one increment upscale beyond the last stylus. The apparatus calibration—that is, the calibration of the ADC 102 or its input signal—must be adjusted according to the selection between these two possible arrangements.

Now returning to the "top half" of the shift register output bus 122, as previously mentioned the five MSB lines enter the off-scale detector 123. The detector 123 determines whether there is a "1" on any of those five lines. If so, then the complete data value in the shift register 104 cannot be represented on the chart 138.

The decoder, stylus driver and chart are only capable of representing the five binary bits at the LSB end of the bus 122. If there are bits in the MSB end, the data value is simply off-scale—for the particular scale expansion represented by the condition of the apparatus at the time of the first negative-going shift/print* clock pulse 155 in FIG. 4.

If this is the case, then the off-scale detector 123 directs an "offscale" signal 124 to the decoder 125. Under these circumstances, when the print enable block 135 is actuated in response to the first negative-going pulse 155 of the shift/print* clock signal 113, the stylus drivers 127 all remain quiescent and produce no indicium at all. In effect the apparatus simply skips making a mark on the chart, and this is the circumstance represented in FIG. 1 for the uppermost curve 26 in the regions above the data peaks.

It was previously mentioned that off-scale indicia could be suppressed for essentially esthetic reasons—to avoid a line of full-scale indicia across the top of the recording. It now can also be understood that with the particular system here described, it is a necessity to at least explicitly identify off-scale indicia, and to control the decoder 125 and stylus drivers 127 accordingly. If the decoder 125 is not suitably controlled, the trailing bits in the LSB end of the data bus 122 will produce an on-scale indicium, at a virtually arbitrary position on the scale. The necessary control of the decoder 125 and drivers 127 may be regarded somewhat inaccurately as "suppressing off-scale indicia" or—as I view it—simply as not actuating styli that are not present.

As the shift & print clock 109 continues to operate, however, it next produces a positive-going pulse 153. This is the first such pulse to occur during the "high" portion of the shift/load* signal 112 (FIGS. 2 and 4) from the selector 108 to the shift register 104. When this positive-going pulse 153 arrives at the "shift clock" input terminal 114 of the shift register 104, the pulse strobes the register to shift—that is to say, to act as a shift register customarily acts.

The register shifts all the bits within it one step "downward" (as drawn in the illustrations). More specifically, the register shifts a zero from its grounded input terminal 121 into the memory position previously occupied by the MSB "512" bit. It also shifts the "512" bit into the position previously occupied by the "256" bit, and so on until the "2" bit has been placed in the position previously occupied by the "1" bit. The "1" bit is dropped.

The effect of this shift is to divide by approximately two the apparent value of the data point stored in the register. (The word "approximately" is used because the "1" bit is dropped, and if there was actually a one stored in the "1" memory position its value is lost. In such a case, the result of the shift is to produce a new data value that is one less than half the old data value.)

Continuing operation of the shift and print clock 109 then produces another negative-going pulse 155 in the shift/print* clock signal 113, which is ignored by the shift register 104 but which actuates the print enable block 135. As a result, an indicium is produced on the chart 138—provided that the off-scale detector 123 has found no ones in the MSB half of the data bus 122.

Of course if there was a one on the "32" line in the bus 122, at the first "print clock*" time, that one will now be shifted down to the "16" line, out of reach of the off-scale detector 123. If that was the only one in the MSB half of the bus 122, the off-scale detector 123 would have previously produced an "offscale" signal 124 but now will not do so. Hence the two-fold reduction in apparent magnitude of the data signal results in bringing the signal "on-scale" at the second "print clock*" time, and also results in avoiding suppression of the printing process.

On the other hand, if there was initially a one on any other signal line in the MSB half of the bus 122, that one will remain in the MSB half of the bus after one shift, and again printing will be suppressed.

The shift & print clock 109, however, has yet to produce four more pairs of positive-going "shift" pulses 153 and negative-going "print" pulses 155. When the last of these "shift" pulses 153 strobes the shift register 104, the MSB half of the register's output bus 122 will contain only zeroes—shifted in progressively from the grounded input terminal 121. The off-scale detector 123 can then be guaranteed to generate no "offscale" signal 124, and the printer will in fact operate at least once.

At the same time the successive shifts will have reduced the apparent magnitude of the data signal by a factor of approximately $2^5$ or thirty-two-fold, so that even an initial signal of 1,023 (ones in all ten bits in the shift register 104) will appear as 31. (Due to the previously mentioned successive dropping of ones from the "1" memory position, the value is 31 rather than 1,023/32=31.96875.)

The previous discussion shows that at some point in the repetitive shift-and-print sequence, every data value which can be held in the ten-bit ADC 102 will produce at least one indicium on the chart.

The sixth and last print clock* pulse is accompanied by the next sync pulse 105, which as will be recalled is transmitted as an "advance" signal 116 to the chart advance block 132. The block 132 mechanically advances the chart. By virtue of inertial effects in the chart advance mechanism, and by virtue of the absence of such effects in the electronic styli, the chart advance is delayed relative to the generation of the indicium. If necessary when using other types of visually readable medium, or other techniques for producing indicia, a suitable delay can of course be provided to ensure that the medium will not advance before or while the indicium is produced.

For the chart recorder illustrated, I prefer to make the chart advance 0.015 inch in response to each such pulse, for a one-inch-wide array of thirty-two styli 131.

If preferred, a magnetic or electronic memory device can be inserted immediately before or after the decoder 125, to save the multiple display signals 122/124, or 126, for later playback and plotting by styli 131. Another possibility is to record the signals from the ADC 102 for later playback to the shift register 104 and sync-pulse shaper 106; in this case, however, the recorder may be regarded as, in effect, part of the data source.

FIG. 3 shows the specific electronic components that can be used to implement the system of FIG. 2, along with commercial part designators for the components. The foregoing discussion will not be entirely repeated, but some details of operation of the system illustrated in FIG. 3 may be helpful to enable a skilled technician to assemble and operate—i. e., to practice—my invention.

The ADC self oscillates at 5.00 Hz (200 msec period), and converts its input to ten-bit binary. At the end of each conversion the ADC status output goes low and triggers the pulse generator 106, which puts out a positive 19 msec pulse at Q and a corresponding negative pulse at Q*.

Meanwhile the McWhorter oscillator 109, which self-oscillates at approximately 33.8 Hz, is synchronized by the pulse generator Q output to run in synchronism with the ADC. It makes six cycles for each ADC conversion.

The bistable circuit 108, formed by the two inverters in cascade with positive feedback, will remain in either state unless forced to change. When the Q* output of the pulse generator goes low, the bistable circuit is forced into its low output state (i. e., "load" command to the shift registers 104). Whenever the McWhorter oscillator output goes low, the bistable circuit is forced into the high output state (i. e., "shift" command to the shift registers).

The chart drive solenoid 132 is energized at each Q* output pulse of the pulse generator (five times per second) and moves the chart one quantum—about 0.015 inch. The printer conductive roller 137 is grounded at 36 (thus completing the path to ground for any energized stylus 131) during the low portion of the McWhorter oscillator output.

"Writing" is inhibited by the NAND gates, as controlled by the five-input NOR gate—all in combination corresponding to the off-scale detector 123. Whenever any of the NOR gate inputs is high, a low signal goes to both NAND inputs, forcing their outputs high and inhibiting both four-line-binary-to-one-of-sixteen decoders—and thus energizing no stylus.

The NAND gates also act as the most significant digit of the address to the four-line-to-one-of-sixteen decoders, when only one NAND output is high.

The two four-line-binary-to-one-of-sixteen decoders together form a five-line-binary-to-one-of-thirty-two decoder, whose input (or address) comes from the five least significant digits that are output by the shift registers.

The high-current source drivers act as amplifiers to produce the current pulses to "write" (i. e., mark the chart paper with a dot).

Upon completion of each ADC conversion, a negative-going pulse occurs at the status output, which triggers the pulse generator. The latter outputs a 19 msec Q pulse to synchronize the McWhorter oscillator, and a 19 msec Q* pulse which moves the chart forward one quantum. The Q* pulse also forces the bistable circuit low, thus preparing the shift registers to load upon their next positive-going strobe.

When the McWhorter oscillator output next goes high (a shift register strobe) the ADC output is loaded into the shift registers and appears at their outputs. If any of the five most significant bits of the ADC ten-bit output is high, the five-input NOR gate produces an "offscale" signal and there is no marking. Otherwise a mark is made (printing occurs) at the negative-going pulse of the McWhorter oscillator clock output. The latter pulse also changes the bistable circuit to high (shift command).

In either case each succeeding clock shifts the ADC output data "down" (i. e., toward the LSB) while adding zeroes to the serial input of the MSB shift register. The NOR gate continues to monitor the five MSBs to generate an "offscale" signal—resulting in no marking—until there are no more ones in the five MSBs. At any negative-going clock pulse where the NOR gate sees only zeroes, a mark is printed. This proceeds for a maximum of six print possibilities. When the last print time is reached the next status pulse also occurs, initiating the next cycle.

If a mark is made at the first print time, only the lowest five bits of the ADC could have been occupied—although it can only be said with certainty that the upper five bits were not occupied. As each succeeding clock shifts all the data toward the LSB (while zeroes are inserted into the MSB position), the binary number is in effect roughly divided by two. Of course, when an odd number is divided by two in this system without fractions or decimal points, the quotient is ½ less than correct. Depending upon the highest occupied bit in the ADC output, from one to six marks may be made for each ADC conversion. Only one mark will appear—at the first stylus—if the ADC output is zero.

As an example, if the MSB of the ADC ten-bit output is a one, the NOR gate will inhibit the drivers 127 through the decoders 125 five times, and only one mark will be made, at some stylus from #16 through #32 (depending upon the actual ADC output).

As another example, if the third digit from the MSB end of the ADC output is the highest one in the ADC, the NOR gate will inhibit the drivers 127 through the decoder 125 only the first three times, and three marks will be made. If the third digit is the only one, the first mark will be made by stylus #32, the second by #16 and the third by #8.

There is an important alternative embodiment of my invention which can provide better resolution over greater chart widths without the very large expense associated with the use of hundreds or thousands of individual styli, but which would be somewhat slower. This embodiment would use a single stylus traveling rapidly and independently across the width of the chart. The position of the stylus on the chart would be proportional to the output of a "binary up counter." Each time the output of the shift registers (at the print clock command) matched the binary up counter, a short power pulse would be delivered to the stylus via the conductive print roller to make a mark.

A plurality of such travelling styli in a train could increase the "time resolution"—i. e., "speed" or "frequency response"—of this type of recorder. The five-line-binary-to-one-of-thirty-two decoder, as well as the multiple high current source drivers, would not be used in these embodiments.

Figure 5:
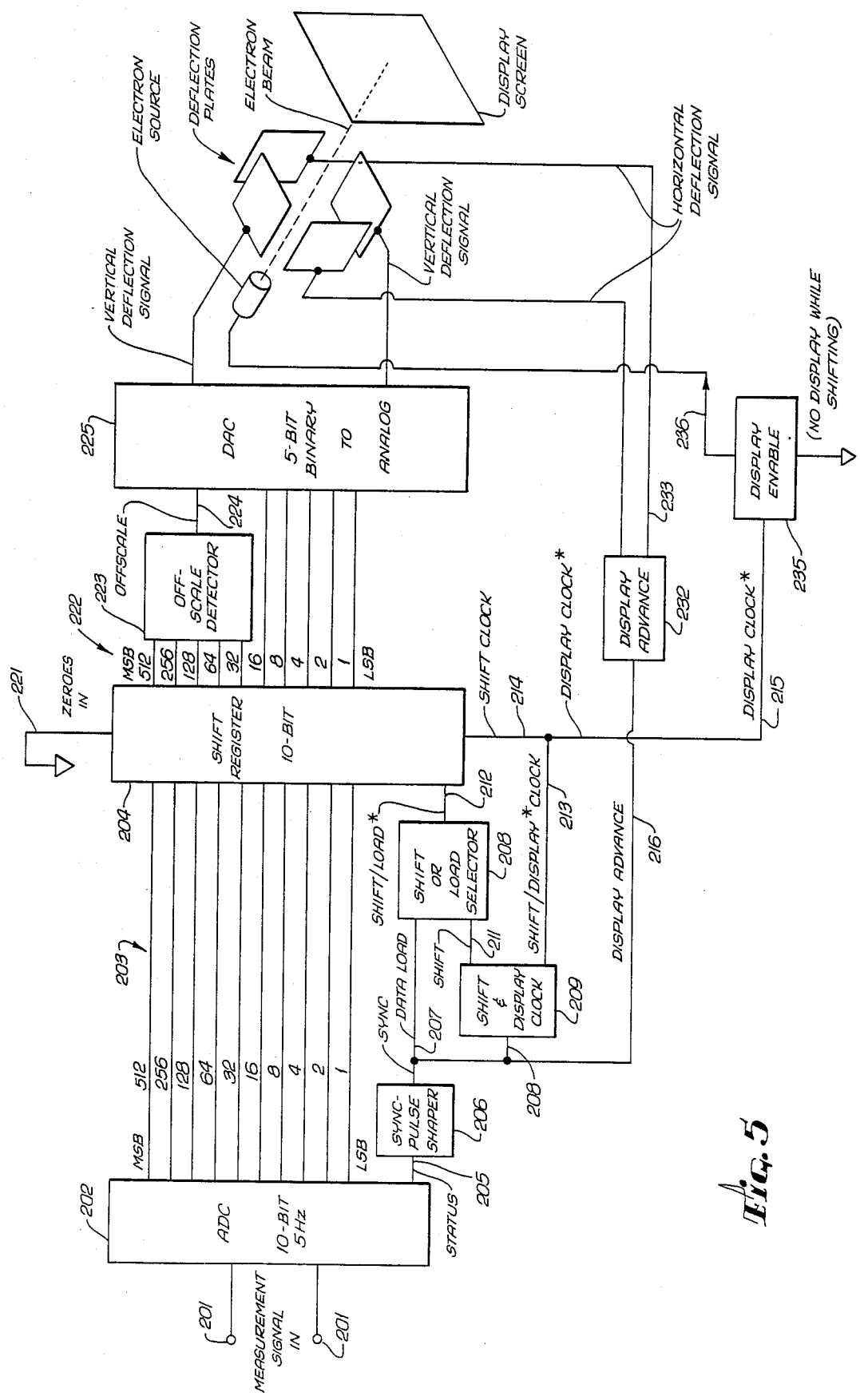
FIG. 5 is an electrical block diagram of another preferred embodiment of my invention, for producing a transitory display of a sequence of data values.

Another embodiment of my invention is shown in FIG. 5. Here the medium is the display screen of a cathode-ray tube, and the indicia-producing means comprise an electron beam that is deflected in one direction to produce the data scale and in another (preferably orthogonal) direction to produce the time-base or other independent-variable scale. (Here, as before, the signals may be recorded at any of various points, for later playback and display.) This system is of course capable of producing not only transitory displays but also—when combined in conventional ways with image-fixing techniques such as photography—permanent records. Other possible display systems include controlled-deflection laser beams, with xerographic recording if desired.

In still other embodiments of my invention much of the hard-wired circuitry shown in FIGS. 2 and 3 can be replaced by a unitary programmed microprocessor. The cost of preparing a suitable chip may make this alternative uneconomic as long as my apparatus is manufactured in small quantities. When it has gained commercial acceptance, however, the programmed-microprocessor approach will probably be found preferable for second-generation production.

It is to be understood that all of the foregoing detailed descriptions are by way of example only, and not to be taken as limiting the scope of my invention—which is expressed only in the appended claims.

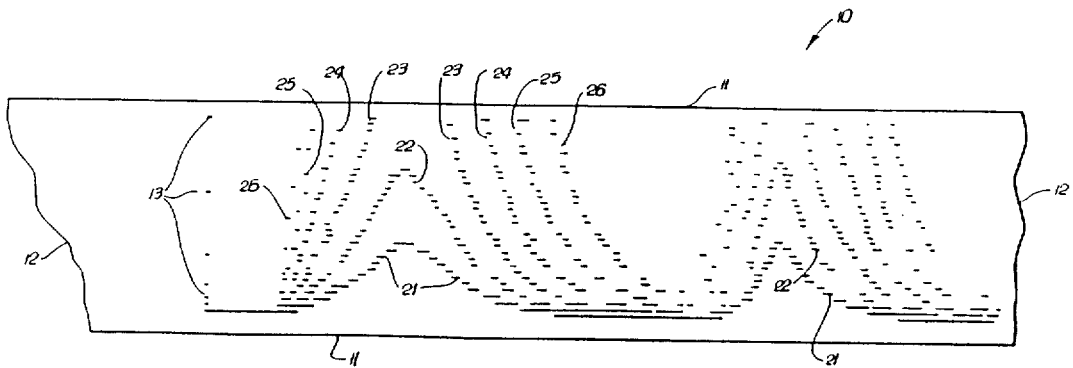

I claim:

1. Apparatus for plotting a sequence of data values in real time as they are received from a single data source at a suitable scale expansion on a visually readable medium, comprising:
    means for receiving said sequence of data values from said single data source and for deriving in response to each of said data values a multiplicity of display signals that substantially correspond to the representation of that data value at a respective multiplicity of scale expansions, comprising:
    means for receiving and deriving, for each of said data values, a first binary signal having a number of data bits sufficient to accomodate binary signals over a range of magnitudes defined by the variation in values of said sequence of data values;
    a shift register adapted to receive and store said first binary signal as a plurality of data bits, and to produce a second binary signal at a set of parallel output-signal lines for transmission to said indicia-producing means, the number of said output-signal lines in the set being large enough to resolve a number of binary signal levels corresponding to the resolution of said indicia-producing means; and
    means for causing the data bits stored in said shift register to be progressively shifted within the register, whereby successive values of said second binary signal represent successively different multiples of said data value;
    means, responsive to said display signals, for producing a corresponding multiplicity of visible indicia on said medium, the magnitude of each of said data values at said respective multiplicity of scale expansions being represented by respective displacements of said indicia from a baseline, along a first dimension of said medium; and
    means for providing relative motion between said medium and said indicia-producing means, along a second dimension of said medium.

2. The apparatus of claim 1, wherein:
    at times when the data bits in said shift register are not being shifted, said indicia-producing means are actuated to record indicia corresponding to said second binary signal; and between said times when said indicia-producing means are actuated, said relative-motion-producing means are actuated to provide said relative motion.

3. The apparatus of claim 2, wherein:
said set of output lines is adapted to receive data bits only from lower order bit memory positions of said shift register; and
while there are one or more non-zero bits in the higher order bit memory positions of said shift register that do not contribute to said second binary signal, said relative-motion-producing means are actuated but said indicia-producing means are not.

4. Apparatus for plotting a sequence of data values in real time as they are received from a single data source at a suitable scale expansion on a visually readable medium, comprising:
a single input device for receiving said sequence of data values from said single data source;
a means for deriving, in response to each of said data values, a multiplicity of display signals that substantially correspond to the representation of that data value at a respective multiplicity of scale expansions, each of said scale expansions being preselected prior to receiving said sequence of data values;
means, responsive to said display signals, for producing a corresponding multiplicity of visible indicia on said medium, the magnitude of each of said data values at said respective multiplicity of scale expansions being represented by respective displacements of said indicia from a baseline, along a first dimension of said medium; and
means for providing relative motion between said medium and said indicia-producing means, along a second dimension of said medium.

5. The apparatus of claim 4, also comprising:
means, responsive to said deriving means, for storing said multiplicity of display signals for later transmission to said indicia-producing means.

6. The apparatus of claim 4, wherein said deriving means comprises:
means for deriving, for each of said data values, a first binary signal having a number of data bits sufficient to accommodate binary signals over a range of magnitudes defined by the variation in values of said sequence of data values;
a shift register adapted to receive and store said first binary signal as a plurality of data bits, and to produce a second binary signal at a set of parallel output-signal lines for transmission to said indicia-producing means, the number of said output-signal lines in the set being large enough to resolve a number of binary signal levels corresponding to the resolution of said indicia-producing means; and
means for causing the data bits stored in said shift register to be progressively shifted within the register, whereby successive values of said second binary signal represent successively different multiples of said data value.

7. The apparatus of claim 6, wherein:
at times when the data bits in said shift register are not being shifted, said indicia-producing means are actuated to record indicia corresponding to said second binary signal; and
between said times when said indicia-producing means are actuated, said relative-motion-producing means are actuated to provide said relative motion.

8. The apparatus of claim 7, wherein:
said set of output lines is adapted to receive data bits only from lower bit memory positions of said shift register; and
while there are one or more non-zero bits in the higher order bit memory positions of said shift, register that do not contribute to said second binary signal, said relative-motion-producing means are actuated but said indicia-producing means are not.

9. The apparatus of claim 4, wherein:
said data source includes ongoing biological processes and instrumentation that produces said data values in response to said biological processes;
said indicia-producing means comprise an electron beam within a cathode-ray tube, and deflection apparatus for controlling deflection of said beam in one direction corresponding to said second dimension;
said relative-motion-producing means comprise deflection apparatus for controlling deflection of said beam in another direction corresponding to said second dimension; and
said medium is also a part of the apparatus and comprises a phosphorescent screen of the cathode-ray tube.

10. The apparatus of claim 9, further comprising:
means for making photographic records of the appearance of said screen.

11. The apparatus of claim 4, wherein:
said visually readable medium is a recording medium; and
said indicia-producing means produce indicia on said recording medium.

12. A method of plotting a sequence of data values received at a single input from a single data source at a suitable scale expansion, comprising:
receiving said sequence of data values at said single input from said single data source; and
simultaneously plotting each of said data values in real time as said values are received, on a visually readable medium at a preselected multiplicity of scale expansions.

13. The method of claim 12, also comprising the steps of:
before said plotting step, with respect to each said data value, recording a multiplicity of display signals that are derived from said data value and that correspond to the display of said data value at said preselected multiplicity of scale expansions; and
between said recording step and said plotting step, with respect to each said data value, playing back said recorded display signals for use in said plotting step.

14. The method of claim 12, wherein:
said data source includes ongoing biological processes and instrumentation that produces said data values in response to said biological processes;
said medium is a cathode-ray-tube screen; and
said plotting step comprises exciting the screen electronically to create phosphorescent images thereon.

15. The method of claim 14, further comprising the step of:
after said plotting step, making photographic records of the appearance of the screen.

16. A method of plotting a sequence of data values in real time as they are received at a single input from a single data source, at a suitable scale expansion on a visually readable medium, comprising:

receiving said sequence of data values from said single data source in the single input and deriving in response to each of said data values a multiplicity of display singles that substantially correspond to the representation of that data value at a respective multiplicity of scale expansions, each of said scale expansions being preselected prior to receiving said sequence of data values;

in response to said display signals, producing a corresponding multiplicity of visible indicia on said medium, the magnitude of each of said data values at said respective multiplicity of scale expansions being represented by respective displacements of said indicia from a baseline, along an indicia-production line that substantially parallels a first dimension of said medium; and providing relative motion between said medium and said indicia-production line, along a second dimension of said medium.

17. The method of claim 16, also comprising the steps of:

before said indicia-producing step, with respect to each said value, recording said multiplicity of display signals that are derived from said recorded display signals for use in said plotting step.

18. The method of claim 16, wherein:

said data source includes ongoing biological processes and instrumentation that produces said data values in response to said biological processes;

said medium is a cathode-ray-tube screen;

said indicia-producing step comprises deflecting an electron beam in one direction within said cathode-ray tube, corresponding to said first dimension, to produce said displacements; and said relative-motion-providing step comprises deflecting said beam in another direction corresponding to said second dimension.

* * * * *

UNITED STATES PATENT AND TRADEMARK OFFICE
CERTIFICATE OF CORRECTION

PATENT NO. : 4,862,387

DATED : August 29, 1989

INVENTOR(S) : Arnold St. J. Lee

It is certified that error appears in the above-identified patent and that said Letters Patent is hereby corrected as shown below:

The title page showing the illustrative Figure should be deleted to appear as per attached title page.

Signed and Sealed this

Fourteenth Day of August, 1990

*Attest:*

HARRY F. MANBECK, JR.

*Attesting Officer*      *Commissioner of Patents and Trademarks*

United States Patent [19]

Lee

[11] Patent Number: 4,862,387
[45] Date of Patent: Aug. 29, 1989

[54] UNIVERSAL-GAIN DATA PLOTTER

[76] Inventor: Arnold St. J. Lee, 1033 Hilts Ave., Los Angeles, Calif. 90024

[21] Appl. No.: 178,893

[22] Filed: Mar. 31, 1988

Related U.S. Application Data

[63] Continuation of Ser. No. 690,594, Jan. 11, 1985, abandoned.

[51] Int. Cl.⁴ .............. G01D 1/16; B43L 33/00; H03L 5/00; G01R 1/38
[52] U.S. Cl. .............. 364/520; 33/33; 33/35; 307/264; 324/115; 324/121 R; 340/723; 340/754
[58] Field of Search ......... 364/520; 340/715, 722, 340/723, 753, 754; 346/33 R, 35; 307/264; 328/53, 163, 172; 324/71.4, 115, 121 R; 367/65, 67

[56] References Cited

U.S. PATENT DOCUMENTS

| | | | |
|---|---|---|---|
| 2,375,570 | 5/1945 | McDermott | 367/65 |
| 3,204,144 | 8/1965 | Deavenport | 324/121 R |
| 3,636,463 | 1/1972 | Ongkiehong | 367/67 X |
| 3,873,918 | 3/1975 | Talbert | 324/115 X |
| 3,886,526 | 5/1975 | Smith | 340/722 X |
| 4,034,291 | 7/1977 | Allen et al. | 324/115 |
| 4,064,480 | 12/1977 | Howlett | 367/67 |
| 4,145,697 | 3/1979 | Ballinger | 46/35 |
| 4,236,151 | 11/1980 | Russ et al. | 340/722 |
| 4,322,816 | 3/1982 | Spangler | 364/520 X |
| 4,334,124 | 6/1982 | Imsand et al. | 364/520 X |
| 4,409,597 | 10/1983 | Nakamura et al. | 346/35 |
| 4,449,120 | 5/1984 | Rialan et al. | 367/67 X |
| 4,581,725 | 4/1986 | Pilarcik, Jr. | 367/65 X |
| 4,679,162 | 7/1987 | Ferber et al. | 367/67 X |
| 4,690,509 | 9/1987 | Bohmer | 340/754 |
| 4,727,521 | 2/1988 | Meyer et al. | 367/65 X |

Primary Examiner—Parshotam S. Lall
Assistant Examiner—Joseph L. Dixon
Attorney, Agent, or Firm—Spensley Horn Jubas & Lubitz

[57] ABSTRACT

This apparatus and method permit plotting a series of data values at an optimum scale expansion, even when the largest value is not known in advance, for permanent recording or transitory display. In response to each data value several display signals are derived, corresponding to representation of that data value at several different scale expansions. These several signals are used to position respective indicia on a visually readable medium. If desired the several display signals may all be recorded, as for example on magnetic tape, and the acutal plotting (i.e., production of indicia) performed later. The data-value magnitude is represented by respective displacements of the indicia in one direction from a baseline, at the several scale expansions. Thus indicia are produced for all of the scale expansions that correspond to on-scale positions. The medium moves relative to the indicia-producing apparatus, along a second, orthogonal direction. Preferred hardware includes a shift register with enough bits for the full range of data; but only the least-significant-bits end, the number of places equalling the display-medium resolution, is used to position indicia.

18 Claims, 5 Drawing Sheets